United States Patent
Zhou et al.

(10) Patent No.: US 10,296,644 B2
(45) Date of Patent: May 21, 2019

(54) SALIENT TERMS AND ENTITIES FOR CAPTION GENERATION AND PRESENTATION

(71) Applicant: Microsoft Technology Licensing, LLC, Redmond, WA (US)

(72) Inventors: Yiping Zhou, Palo Alto, CA (US); Gianluca Donato, Los Altos, CA (US); Aparna Rajaraman, Sunnyvale, CA (US); Oana Nicolov, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 369 days.

(21) Appl. No.: 15/070,989

(22) Filed: Mar. 15, 2016

(65) Prior Publication Data
US 2016/0283593 A1 Sep. 29, 2016

Related U.S. Application Data

(60) Provisional application No. 62/136,816, filed on Mar. 23, 2015.

(51) Int. Cl.
*G06F 7/00* (2006.01)
*G06F 17/30* (2006.01)

(52) U.S. Cl.
CPC .. *G06F 17/30864* (2013.01); *G06F 17/30401* (2013.01)

(58) Field of Classification Search
CPC ......... G06F 17/30864; G06F 17/30401; G06F 17/30554; G06F 17/3053

USPC ................... 707/706, 772, E17.03, 767, 776
See application file for complete search history.

(56) References Cited

U.S. PATENT DOCUMENTS

| | | |
|---|---|---|
| 7,587,387 B2 | 9/2009 | Hogue |
| 7,912,849 B2 | 3/2011 | Ohm et al. |
| 8,195,655 B2 | 6/2012 | Agrawal et al. |
| 8,239,377 B2 | 8/2012 | Milic-Frayling et al. |

(Continued)

OTHER PUBLICATIONS

Iofciu, "Evaluating the Impact of Snippet Highlighting in Search", In proceedings of the 32nd Annual ACM SIGIR Conference, Jul. 19-23, 2009, 4 pages, Boston, Massachusetts, USA.

(Continued)

*Primary Examiner* — M D I Uddin
(74) *Attorney, Agent, or Firm* — Jeffrey L. Ranck; Ranck IP Law (57) ABSTRACT

Architecture that enables the extraction of document-specific salient terms from documents for use improving the result summaries on a search engine result page (SERP), and methods to extract the salient terms from the documents using search engine logs, document metadata, and other algorithms. Document-specific salient terms can provide additional information and significantly improve user success in finding relevant documents while disregarding non-relevant documents. The architecture also enables the extraction of entity information from a variety of sources, some of which are at a query level, and other sources that are specific to a single document. All the entities available are aggregated for a set of results and the most relevant results are identified. The final set of results is then used to determine where in the document summary to apply visual emphasis or cues (e.g., bolding).

14 Claims, 9 Drawing Sheets

(56) References Cited

U.S. PATENT DOCUMENTS

| | | | |
|---|---|---|---|
| 8,285,745 B2* | 10/2012 | Li | G06F 17/30672 |
| | | | 707/706 |
| 8,515,986 B2 | 8/2013 | Salvetti et al. | |
| 8,655,866 B1 | 2/2014 | Provine et al. | |
| 8,676,827 B2 | 3/2014 | Metzler et al. | |
| 8,762,392 B1 | 6/2014 | Yamauchi | |
| 8,775,439 B1 | 7/2014 | Lasko et al. | |
| 8,793,260 B2 | 7/2014 | Haykal et al. | |
| 8,812,509 B1 | 8/2014 | Pasca et al. | |
| 2007/0185857 A1* | 8/2007 | Kienzle et al. | G06F 17/30253 |
| 2008/0114751 A1* | 5/2008 | Cramer | G06F 17/30867 |
| 2012/0130978 A1 | 5/2012 | Li et al. | |
| 2013/0080460 A1* | 3/2013 | Tomko | G06F 17/30864 |
| | | | 707/767 |
| 2013/0173604 A1 | 7/2013 | Li et al. | |
| 2014/0172900 A1 | 6/2014 | De Barras et al. | |
| 2015/0134498 A1* | 5/2015 | Patel | G06Q 10/087 |
| | | | 705/28 |

OTHER PUBLICATIONS

Gamon, et al., "Understanding Document Aboutness Step One: Identifying Salient Entities", In Microsoft Research Technical Report MSR-TR-2013-73, Nov. 2013, 21 pages.

Cui, et al., "Probabilistic Query Expansion Using Query Logs", In Proceedings of the eleventh international conference on World Wide Web, May 7, 2002, 8 pages.

* cited by examiner

SALIENT TERMS AND ENTITIES FOR CAPTION GENERATION AND PRESENTATION

CROSS-REFERENCE TO RELATED APPLICATIONS

This application claims the benefit of U.S. Provisional Patent Application Ser. No. 62/136,816 entitled "SALIENT TERMS AND ENTITIES FOR CAPTION GENERATION AND PRESENTATION" and filed Mar. 23, 2015, the entirety of which is incorporated by reference herein.

BACKGROUND

Search engines need to present results in a way that enables the user to easily and quickly decide whether the results are relevant to the user intent. Document summaries (also referred to as captions) have traditionally used bolded text to emphasize the query terms and make the summaries easier to parse. However, existing query terms and query expansion/alterations are not tailored to individual documents. Moreover, web pages tend to include numerous entities that are not considered to be salient. Consequently, the query terms and query expansion/alterations cannot consistently convey document content and relative importance, as compared to other search results.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables the extraction of document-specific salient terms (also referred to as "aboutness") from documents (e.g., any searchable document sources such as web, networked, client machine, etc.) for use in improving the result summaries on a search engine result page (SERP), and methods to extract the salient terms from documents using various algorithms on search engine logs, document metadata, and other sources. Salient terms are those terms that are described as the most prominent or conspicuous among less prominent or conspicuous terms, and visually indicated (e.g., bolded) as such. Saliency can be defined as a function of the intent of the document author, and not a function of the user querying for search results. Thus, while a result document may be salient, it may not be relevant to the intent of the searching user. Document-specific salient terms can provide additional information and significantly improve user success in finding relevant documents while disregarding non-relevant documents.

More specifically, the disclosed architecture enables at least the following: the automatic extraction of salient terms for web documents using various algorithms on search engine logs, document metadata, and other sources; the generation of document summaries using the salient terms; the annotation of the web documents (search results and summaries) with salient terms; the ability to generate more relevant captions by augmenting the query with the salient terms; and, the application of visual (graphical) emphasis (e.g. bolding, highlighting, font or color changes, etc.) to the salient terms appearing in the caption (also referred to as a document summary and search results on the SERP) as visual cues for the user to quickly identify relevant documents.

The salient terms can also be used to remove visual (graphical) emphasis for the query (e.g., the salient term is "us airways" and query term is "contact us airways", the salient term can be used by the visual component to decide not to apply emphasis on "contact us" or "contact" in the document summary). In other words, the salient terms can be used to determine where in the caption to apply visual (graphical) emphasis as visual cues for the user to quickly identify documents relevant to the results the user wants to see.

The disclosed architecture also enables the extraction of entity information from a variety of sources, some of which are at a query level, and other sources that are specific to a single document. Entities have a distinct, separate existence, such as a person, a movie, company names, a location, a restaurant, an event, a book, a song, an album, or a place of interest. Entities can be concepts as well (e.g., information retrieval, computer science, etc.). Each entity has a name and a set of other attributes that describe it. All the entities available are aggregated for a set of results and the most relevant results are identified. The final set of results is then used to apply visual emphasis or cues (e.g., bolding) to additional terms on the page. One example can be the factual answer to user queries like "What is the capital of California", in which case, the terms "Sacramento" are bolded, for example, everywhere on the page. Another example, for a query "Obama", bolds the terms "Barack Obama" or "Michelle Obama" wherever these terms or combinations thereof, appear in a result summary.

The final set of terms to be visually cued (e.g., bolded) can then be used by other components that add text to the search result page, to improve term bolding and the overall visual consistency of the page. In particular, the advertisement blocks in the SERP can benefit from these additional terms. For example, better use of highlighting has proven to improve the effectiveness of advertisements (i.e., more click-through action and thus, more money).

The disclosed architecture extracts entity information that may or may not be directly related to the query and uses that entity information to identify additional terms to visually cue. For example, bolding the same set of terms wherever the terms appear on the SERP is a visible aspect that is non-existent in conventional systems.

In an alternative implementation, or in combination with the document salient terms, user-specific salient terms (e.g., extract salient terms from documents read by the user performing the search and/or one or more specific other users) can be extracted and utilized in document summary generation. Thereafter, the document summary is generated and visual emphasis is applied according to the user-specific salient terms. In other words, one or more algorithms not only compute the salient terms but also the salient terms associated with a specific user.

In yet another alternative implementation, salient terms of users or specific groups of users, and salient terms from interactions of a single user, such as identified in a search history, a browsing history, etc., (referred to as collectively-derived salient terms from a collection of users or actions of a single user) can be extracted and utilized in document summary generation. The collection of users can be an ad hoc collection of users that are related in some way, such as the query terms, live in the local area, etc., or a collection of users each having a strong connection(s) to the group (e.g., work for the same company, in the same corporate group, working on the same project, etc.), such as all electrical engineers, or all software designers, etc. Thereafter, the document summary is generated and visual emphasis is applied according to the collectively-derived salient terms, as well as the query terms. In other words, the one or more algorithms not only compute the salient terms of the querying user, but also the collectively-derived salient terms associated with multiple other users.

Accordingly, the disclosed architecture can be implemented as a system, comprising: at least one hardware processor and a memory, the at least one hardware processor configured to execute computer-executable instructions in the memory to enable one or more components, comprising; an extraction component configured to extract salient terms from web documents returned for a query; a document summary component configured to generate document summaries of a search results page, the document component configured to incorporate the salient terms in the generation of the document summaries; and, a visual component configured to apply visual emphasis to the salient terms and the query terms in the document summaries of the search results page.

In an alternative system implementation, the disclosed architecture can comprise at least one hardware processor and a memory, the at least one hardware processor configured to execute computer-executable instructions in the memory to enable one or more components, comprising; an extraction component configured to extract salient terms from web documents returned for a query; a document summary component configured to generate the document summaries of a search results page based on a combination of the salient terms and query terms of the query; and, a visual component configured to apply visual emphasis to the salient terms and the query terms in the document summaries of the search results page.

The disclosed architecture can also be implemented as a method, comprising acts of: extracting salient terms from web documents associated with a query; combining the salient terms with query terms in document summaries of a search results page; and, applying visual emphasis to the salient terms and the query terms in the document summaries of the search results page as visual cues.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Traditional methods to identify salient content and/or to extract representative keywords from a document are computationally expensive and slow, and require access to the full content of the document. Moreover, it is difficult to appropriately convey how relevant a document is for a given query in the limited space available on a search engine results page (SERP). Further, it is difficult for the user to discriminate between different documents to identify the most relevant document for the user's specific intent.

The disclosed architecture solves these problems in search by identifying, extracting, and using additional terms, salient terms, to generate contextual descriptions (document summaries) that are more informative since the contextual descriptions are more tuned (focused) to the important content the user wants to see. Additionally, the additional salient terms (and query terms) in the document summary can be bolded (or other visual emphasis provided such as highlighting), for example, as may also be performed consistently on other regular query terms, to assist the user in visually discriminating between documents and to choose documents the users deems relevant more quickly and effectively. Methods to compute this more cheaply and reliably can be obtained using query logs and other algorithms, for example.

Existing attempts at solving search problems have to do with extracting factual information from documents and improving search results using the factual information to answer user queries. Another attempt is a method of extracting dominant entities from documents (with the restrictive definition of an entity as relates to a document such as a Wikipedia™ page).

The disclosed architecture is distinctive from these and other existing methodologies and systems in that a much more general concept of "saliency" is provided, which is not limited to dominant entities or factual information. The disclosed architecture employs a concept of "representative" sets of keywords and/or phrases, which concept is not prescriptive (e.g., not according to the imposition or enforcement of a rule or method). The extracted salient terms are likely to readily help a user understand (through visual cues) the importance of any document result when quickly perusing (or visually scanning) the set of results returned by the search engine for any given query (not just factual). Moreover, the disclosed architecture employs the extra salient terms to improve the document summaries (titles and snippets) and "highlight" (applies visual cues) the extra salient terms (e.g., with bolding) to further help the user discriminate between the search results.

In yet another comparison, an existing system proposes an idea of highlighting the important terms in document summaries, but only for ambiguous queries. However, in contrast, the disclosed architecture significantly expands on this notion and differs in the following ways:

The automatic extraction of salient terms is much broader. The disclosed architecture uses different input data and algorithms to produce the most relevant set (i.e., data sources beyond clicks, anchor text, and Wikipedia™ disambiguation), different algorithms (i.e., generating terms instead of selecting from input terms), and produces new terms which may not be present in any of the inputs.

The disclosed architecture uses salient terms to generate the summary itself, and when generating the summary, includes the salient terms in the document summary, whereas the existing attempts use terms only for highlighting.

The coverage of the disclosed architecture, which operates on every query, is much larger and more scalable, while the existing systems are limited to ambiguous queries, only.

In the disclosed architecture, the new terms are presented to the user via a variety of different character embellishments such as regular bolding, rather than simply the special highlighting schemes in traditional systems.

More specifically, the disclosed architecture extracts salient terms for each document (e.g., offline), and stores the salient terms in the index (document e.g., web). For "fresh" documents ("fresh" as relates to, e.g., more recent creation date, more user/click traffic, frequent content change, increased link growth, etc., and as one or all of these can relate to time), in contrast to a "stale" documents ("stale" as relates to, e.g., older creation date, less user/click traffic, infrequent content change, poor link growth, etc., and as one or all of these can relate to time), extraction can be on-the-fly (occur dynamically rather than in response to an action being statically predefined) and the fresh documents/salient terms can be cached, instead of or in combination with being indexed. Additionally, at caption (document summary) generation time, the query can be combined with the salient terms to generate a more informative summary. Furthermore, the salient terms in the summary can be visually emphasized with the regular query terms. Another component then ensures that all instances of the visually-emphasized terms are consistently visually emphasized, everywhere on the SERP.

The document-specific salient terms can be combined with the query terms in different ways: a naïve way is to append the salient terms with no regard for duplication or weighting. Alternatively, different weights can be assigned to each term based on the term source and/or other considerations. For example, a decision can be made to weight terms actually typed by the user greater than altered terms or those terms extracted from the document.

Algorithms for term extraction, include, but are not limited to: mining the historical logs for queries that produced that document in the top ten results; aggregating existing document metadata (e.g., the content of the HTML (hypertext markup language) title tag, meta description, or OpenGraph™ (a protocol that enables a web document to be converted into a rich object in a social graph) annotations) to extract the dominant terms; factual answers for question-like queries (e.g., using "Canberra" as the salient term for all documents returned for the query "what is the capital of Australia"); Wikipedia pages (use the title of Wikipedia pages co-appearing with a given document, as additional salient co-terms, for example, "Herpes Zoster" for all documents returned for the query "shingles"); and, website name information, for home pages (e.g., "PriceWaterhouseCoopers" for site www.pwc.com).

All of the above various sources produce candidate terms that can then be combined and ranked to select the most salient terms overall. Document matching can be employed as well.

The following description details the use of entity information to improve contextual summaries for search engine results.

A challenge for the user interface of search engines is to convey how the documents presented relate to the user query, and the document relevance to the query. Contextual summaries have proven to be an effective way to describe the document content and the content relationship to the query. Bolded text, for example, can be used to emphasize (visually cue) terms in the summaries that are either part of the query or closely related to the query (e.g., spell corrections or acronym expansions), but can also be terms that are representative of the document content.

Information about entities related to the query, or that are important for the content in the documents returned, can be used to generate improved summaries. Making the summaries more descriptive and clearly descriptive of the relationship between the document and the query has a measurable impact on user satisfaction and the speed to task completion.

The disclosed architecture enables the extraction of entity information from a variety of sources, some of which are at a page level, and other sources that are specific to a single document. Entities have a distinct, separate existence, such as a person, a movie, company names, a location, a restaurant, an event, a book, a song, an album, or a place of interest. Each entity has a name and a set of other attributes that describe it. All the entities available are aggregated for a set of results and the most relevant results are identified. The final set of results is then used to apply visual emphasis or cues (e.g., bolding) to additional terms on the page. One example can be the factual answers to user queries like "What is the capital of California", in which case, the terms "Sacramento" are bolded, for example, everywhere on the page. Another example, for a query "Obama", bolds the terms "Barack Obama" or "Michelle Obama" wherever these terms or combinations thereof, appear in a result summary.

The final set of terms to be visually cued (e.g., bolded) can then be used by other components that add text to the search result page, to improve term bolding and the overall visual consistency of the page. In particular, the advertisement blocks in the SERP can benefit from these additional terms.

The disclosed architecture extracts entity information that may or may not be directly related to the query and uses that entity information to identify additional terms to visually cue. For example, bolding the same set of terms wherever the terms appear on the SERP is a visible aspect that is non-existent in conventional systems.

The component that generates document summaries (the document summary component) can also be configured to extract the document-specific entity information, and return the document-specific entity information with the final summary. A module (component) that consumes all summaries can also be configured to extract all the entities from the documents and combine the entities with the other terms and phrases to be visually emphasized. This new set of terms and phrases can then be augmented with additional sources (e.g., the output of "instant answers" that produce entities and other information relevant to the query). Another module (component, such as a ranking component) can then be configured to rank the full set of strings (terms) to be bolded, for example, and select the most relevant strings. The final set of strings is then used to bold the desired terms, for example, in some or all summaries. Other modules that display text on the same page (e.g., advertisements) can consume the final set of strings and bold, for example, the final set of strings as well, for consistency with the rest of the page. In other words, the type of visual emphasis applied to one set of terms (query) is then used for visual emphasis for all terms (salient) designated for visual cueing. Consistency defines that if the query terms are bolded, then the salient terms are bolded as well to be consistent with the highlighting of the query terms. Alternatively, if the query terms are highlighted, the salient terms will be highlighted as well to be consistent with the highlighting of the query terms.

The disclosed architecture exhibits technical effects rooted in computer technology to overcome problems specifically occurring in the realm of computer systems and networks. More specifically, the architecture enables improved user efficiency in search by not only providing increased relevancy of search results (documents) to the user query, but also annotating the salient terms and query terms in the SERP for quicker visual identification of search results.

Additionally, increased user action performance is facilitated by the visual cues provided throughout the search results on the SERP. The ability to visually identify the salient terms and query terms in document summaries, for example, enables more efficient and effective user interaction and performance in selecting and navigating to the desired result documents.

Furthermore, the application of visual emphasis to the terms/phrases in the search results enables improved user performance when less user interface display space is available when searching using small device displays such as on cell phones, tablets, and the like, since the visual cues of the terms provided in the SERP provide the focus for the user, rather than other less- or non-relevant content in the page.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
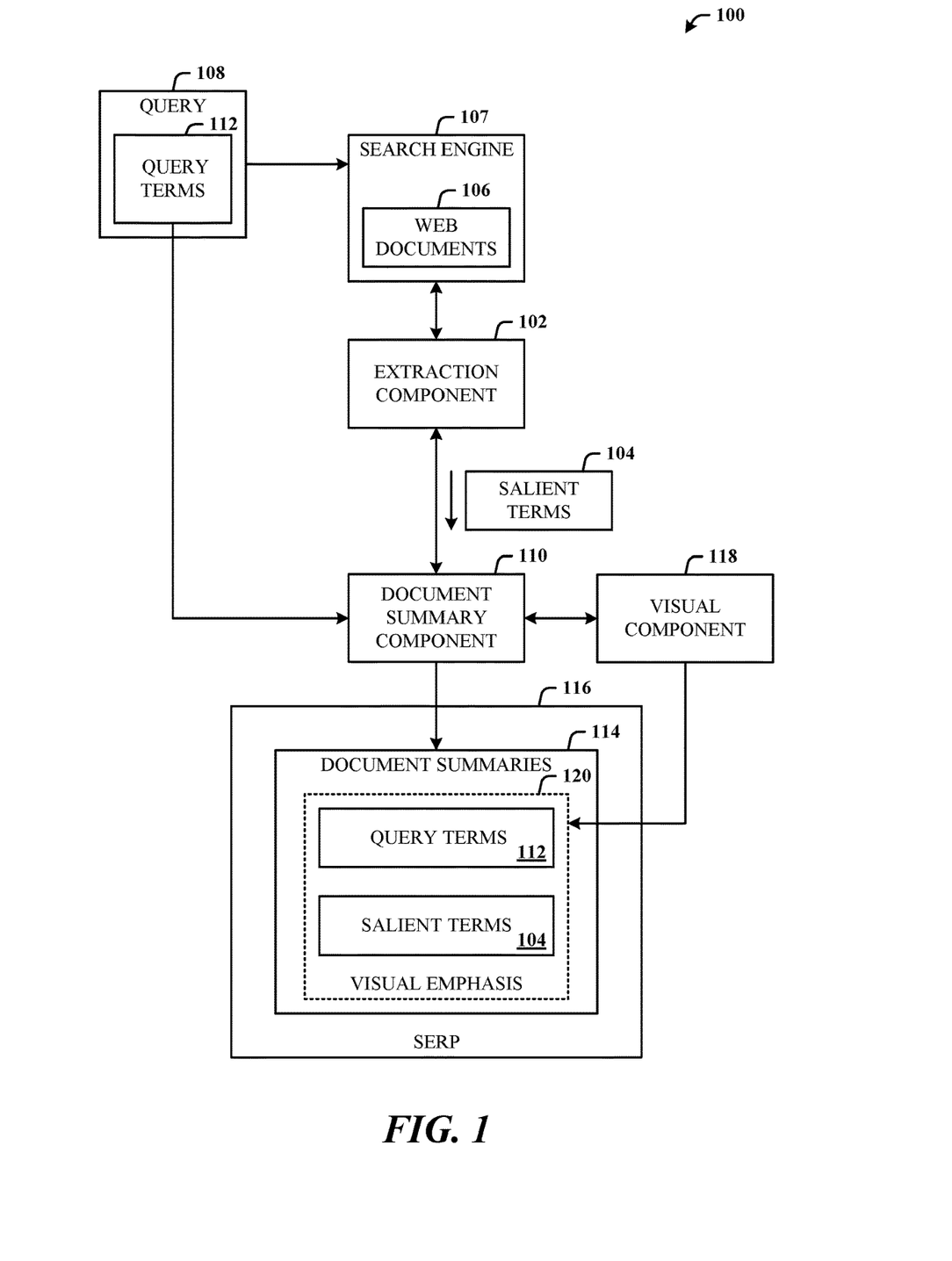
FIG. 1 illustrates a system in accordance with the disclosed architecture.

FIG. 1 illustrates a system 100 in accordance with the disclosed architecture. The system 100 can include an extraction component 102 configured to extract (or that extracts) salient terms 104 from web documents 106 returned (obtained) from a search engine 107 for a query 108. A document summary component 110 is provided and configured to generate document summaries 114 of a search engine results page 116. The document summary component 110 can also be configured to incorporate the salient terms 104 in the generation process of the document summaries 114. The generation process can include incorporation of the salient terms 104 with query terms 112 of the query 108 in the document summaries 114.

A visual component 118 is provided and configured to apply (that applies) visual emphasis 120 to the salient terms 104 and the query terms 112 in (some or all) the document summaries 114 of search results the search engine results pages 116. Alternatively, the visual component 118 can be guided by both salient terms and query terms to apply visual emphasis in some or all the document summaries 114 in the SERP.

The extraction component 102 can be configured to identify and extract the salient terms from feed documents of realtime feeds and enable caching of the salient terms from the feed documents. The extraction component 102 can be configured to identify and extract the salient terms from a ranked set of candidate salient terms obtained from historical logs of queries. The extraction component 102 can also be configured to identify and extract the salient terms from a ranked set of candidate salient terms obtained from aggregated document metadata. The extraction component 102 can also be configured to identify and extract the salient terms from a ranked set of candidate salient terms obtained from factual answers to queries. The extraction component 102 can also be configured to identify and extract the salient terms from a ranked set of candidate salient terms obtained from website name information of home pages. The extraction component can also be configured to identify and extract the salient terms from a ranked set of candidate salient terms obtained from an online digital encyclopedia of user-editable data.

The extraction component can be configured to identify and extract source-specific salient terms related to identity of a source (e.g., specific user, device, system, etc.) of the query, and incorporate the source-specific salient terms in the generation of the document summaries. The visual component 118 can be configured to apply the visual emphasis to the source-specific salient terms and the query terms in the document summaries 114.

In combination with, or alternatively thereto, the extraction component can be configured to identify and extract collectively-derived salient term or terms related to other users and/or groups of other users, and incorporate the collectively-derived salient term or terms in the generation of the document summaries. The visual component 118 can be configured to consistently apply the visual emphasis to the collectively-derived salient term or terms and the query terms in the document summaries 114, throughout the results of the SERP.

The system 100 can also comprise at least one hardware processor configured to execute computer-executable instructions in a memory, the instructions executed to enable the extraction component 102, the document summary component 110, and the visual component 118.

Figure 2:
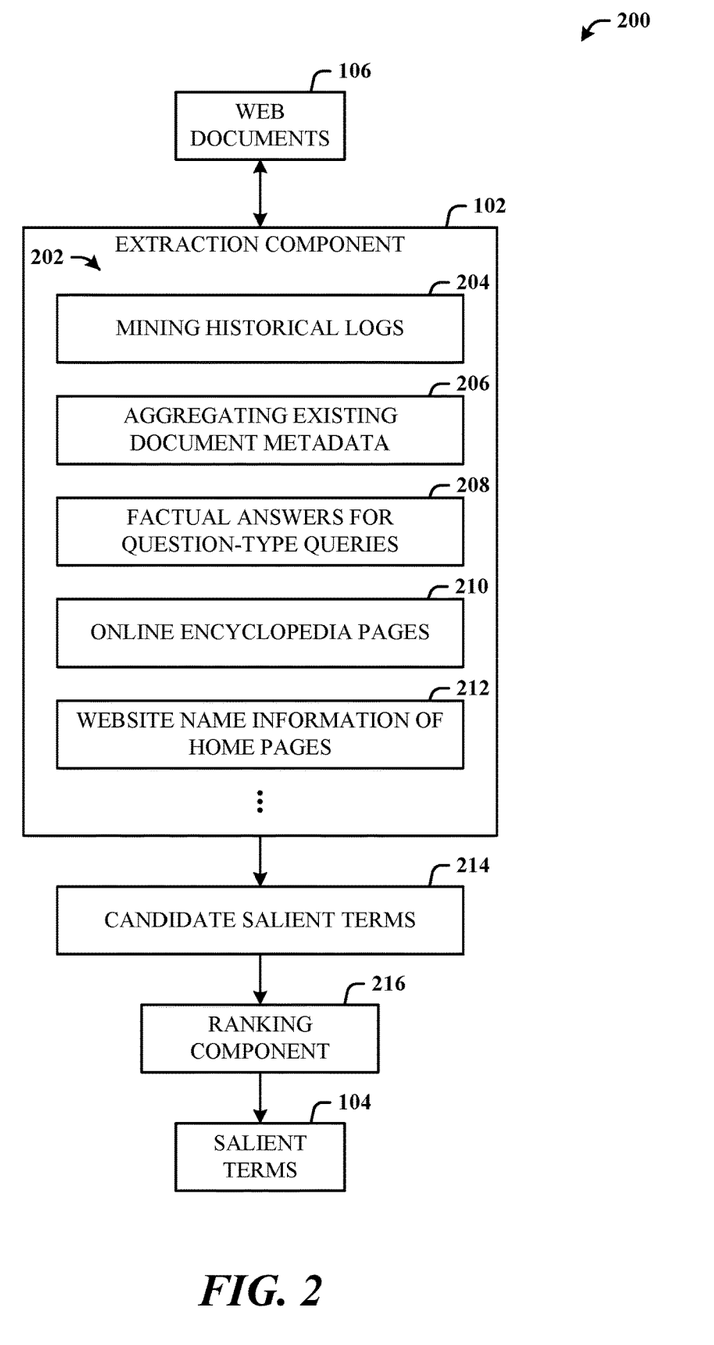
FIG. 2 illustrates a system of sources and algorithms of the extraction component that can be employed for computing the salient terms.

FIG. 2 illustrates a system 200 of sources and algorithms 202 of the extraction component 102 that can be employed for computing the salient terms 104. The sources and algorithms 202 can comprise one or more of the following: mining the historical logs 204 (for queries that produced that document in the top ten results); aggregating existing document metadata 206 (e.g., the content of the HTML (hypertext markup language) title tag, meta description, or OpenGraph annotations) to extract the dominant terms; factual answers for question-like queries 208 (e.g., using "Canberra" as the salient term for all documents returned for the query "what is the capital of Australia"); online digital encyclopedia (e.g., Wikipedia) pages 210 (use the title of Wikipedia pages co-appearing with a given document, as additional salient terms, for example, "Herpes Zoster" for all documents returned for the query "shingles"); and, website name information 212 for home pages.

The extraction component 102 extracts candidate salient terms 214 from the web documents 106 using the sources and algorithms 202, and the candidate salient terms 214 are passed to a ranking component 216 to ultimately output the salient terms 104 base on tanking criteria (e.g., the top x salient terms).

Figure 3:
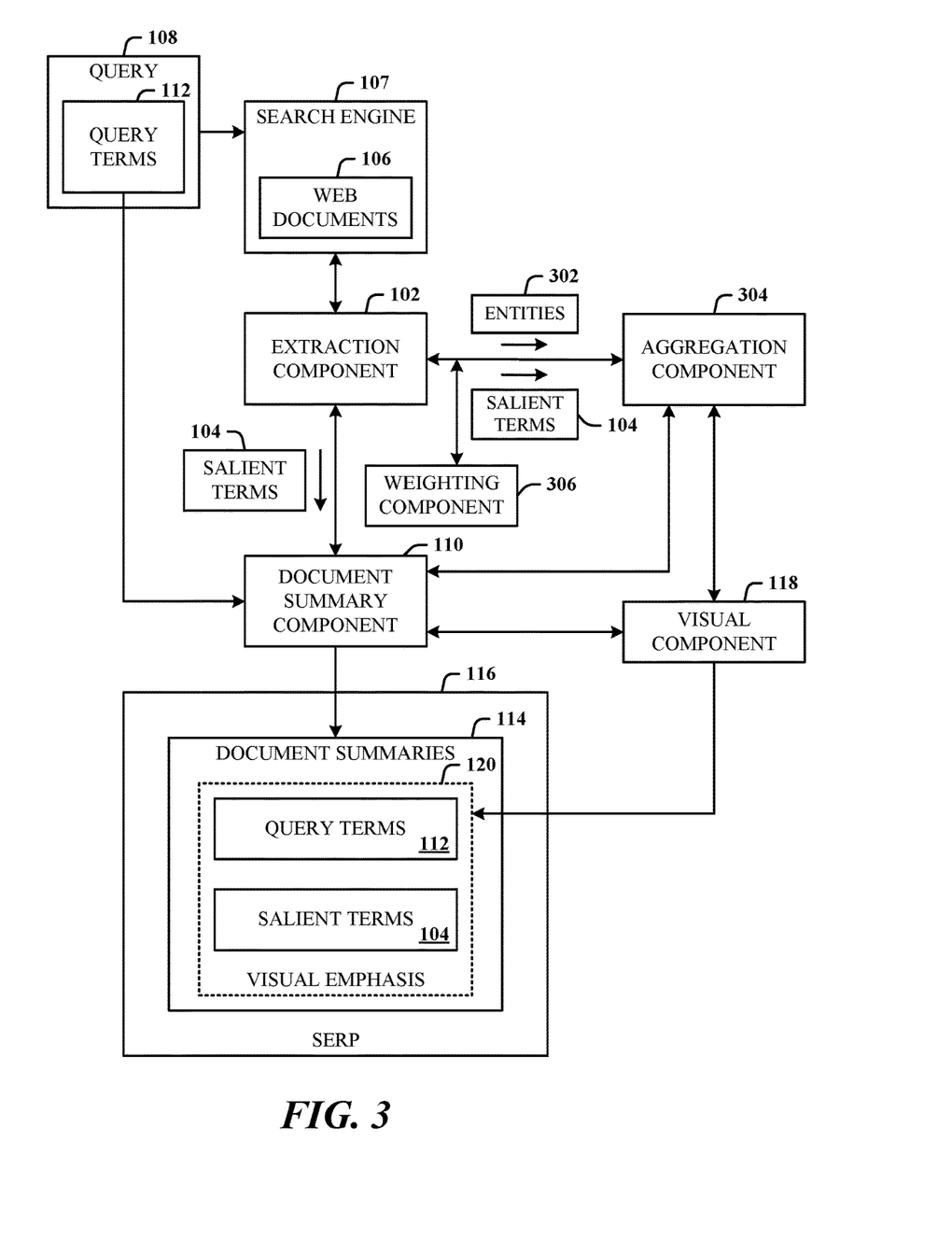
FIG. 3 illustrates an alternative system where the extraction component extracts entities.

FIG. 3 illustrates an alternative system 300 where the extraction component 102 extracts entities 302. The system 300 comprises the system 100 of FIG. 1, as well as an aggregation component 304 and a weighting component 306. The aggregation component 304 can be employed to perform aggregation functions such as for aggregating document metadata and entity aggregation, of example.

As before, the extraction component 102 extracts salient terms 104 from the web documents 106 returned for a query 108. The document summary component 110 combines the salient terms 104 with query terms 112 of the query 108 in the document summaries 114 of the search results page 116. The visual component 118 applies the visual emphasis 120 to the salient terms 104 and the query terms 112 in all the document summaries 114 of the search results page 116. When working with entity extraction, the extraction component 102 extracts the entities 302 and the salient terms 104 from the web documents 106, sends the entities 302 and the salient terms 104 to the aggregation component 304, where the entities 302 and salient terms 104 are aggregated for a set of results, and the most relevant results are identified. The final set of results is then used to apply visual emphasis or cues (e.g., bolding) to additional terms on the results page, using the visual component 118. Although depicted that the non-aggregated salient terms 104 are passed to the document summary component 110, it is to be understood that alternatively, the salient terms 104 can be aggregated (through the aggregation component 304) before being used in the generation of the document summaries.

The weighting component 306 can be configured to assign weighting values to the salient terms 104, entities 302, and/or query terms 112, based on criteria such as corresponding sources of the result documents, and/or based on other considerations such as relevance to the query, location in the documents, number of times identified in the documents, and so on.

One example can be the factual answers to user queries such as "What is the capital of California", in which case, the terms "Sacramento" are bolded, for example, everywhere on the page. Another example, for a query "Obama", bolds the terms "Barack Obama" or "Michelle Obama" wherever these terms or combinations thereof, appear in a result summary.

The final set of terms to be visually cued (e.g., bolded) can then be used by other components that add text to the search result page, to improve term bolding and the overall visual consistency of the page. In particular, the advertisement blocks in the SERP can benefit from these additional terms.

It is to be understood that in the disclosed architecture, certain components may be rearranged, combined, omitted, and additional components may be included. For example, one or more of the extraction component 102, document summary component 110, visual component 118, weighting component 306, and aggregation component 304 can be included with the search engine 107.

The disclosed architecture can optionally include a privacy component that enables the user to opt in or opt out of exposing personal information. The privacy component enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process.

Consent can take several forms. Opt-in consent can impose on the user to take an affirmative action before the data is collected. Alternatively, opt-out consent can impose on the user to take an affirmative action to prevent the collection of data before that data is collected.

Figure 4:
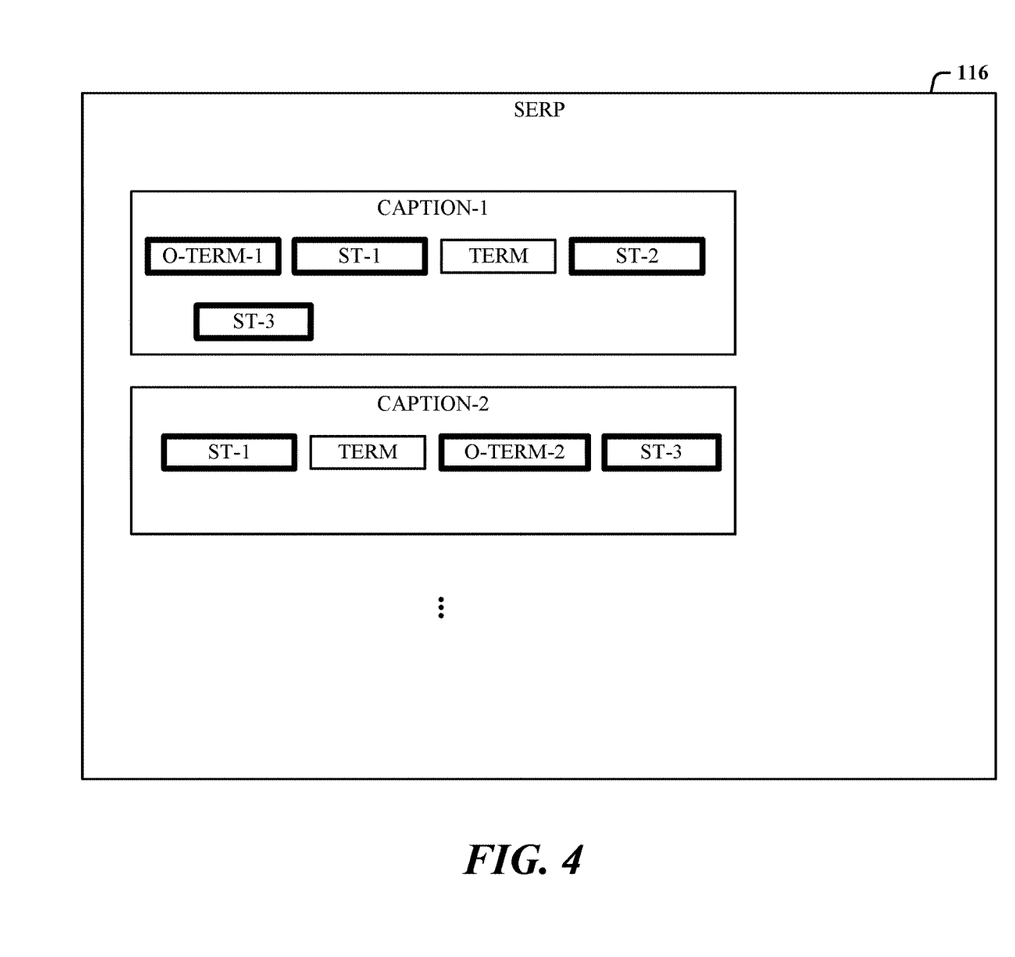
FIG. 4 illustrates exemplary captions of the SERP with visual emphasis applied in accordance with the disclosed architecture.

FIG. 4 illustrates exemplary captions (summaries) of the SERP 116 with visual emphasis applied in accordance with the disclosed architecture. Here, there are two captions (summaries) shown (Caption-1 and Caption-2) of multiple captions in the SERP 116. The salient terms (ST-x) have been identified in all captions of the SERP 116 as well as terms (O-Term y) in the query. This enables the user focus to be readily directed to the terms (query and salient) so the user can visually identify and determine the most relevant captions.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
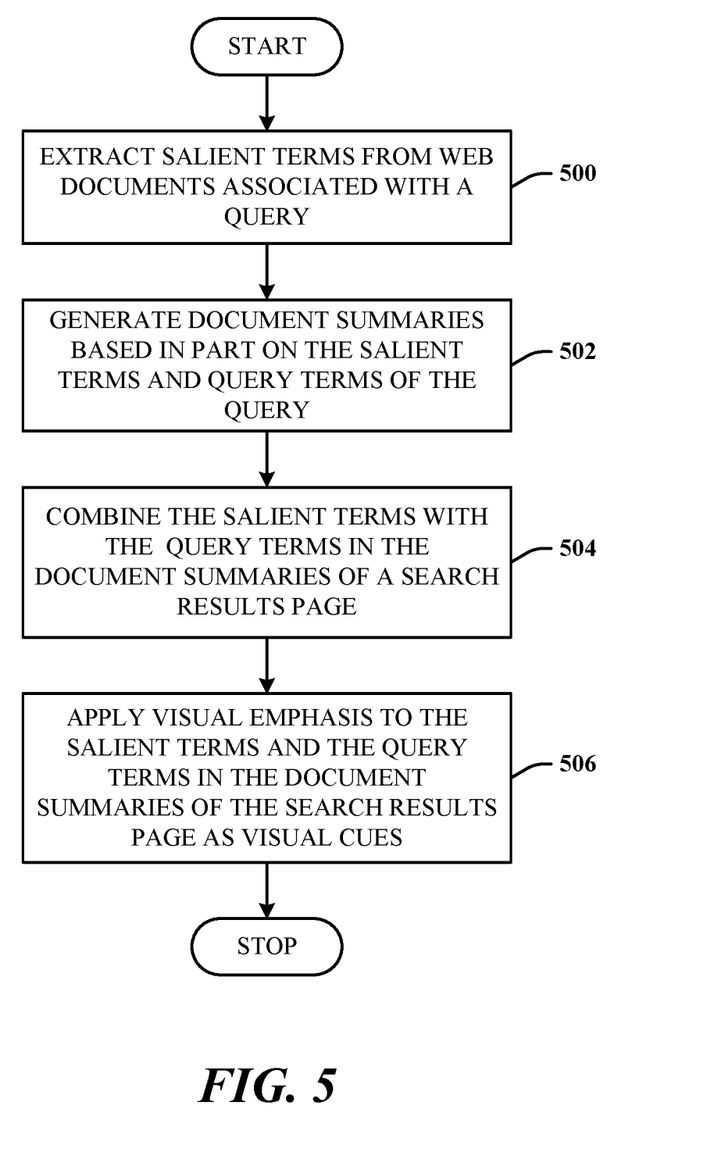
FIG. 5 illustrates a method in accordance with the disclosed architecture.

FIG. 5 illustrates a method in accordance with the disclosed architecture. At 500, salient terms are extracted from web documents associated with a query. At 502, document summaries are generated, in part, from the salient terms and query terms of the query. At 504, the salient terms are combined with the query terms of the query in document summaries of a search results page. At 506, visual emphasis is applied to the salient terms and the query terms in the document summaries of the search results page. Alternatively, visual emphasis can be applied according to the salient terms and the query terms in all the document summaries of the search results page.

The method can further comprise adding the salient terms to a document search index. The method can further comprise extracting salient terms from fresh documents and caching the salient terms. The method can further comprise identifying the salient terms from a ranked set of candidate salient terms obtained from historical logs of queries or aggregated document metadata.

The method can further comprise identifying the salient terms from a ranked set of candidate salient terms obtained from factual answers to queries. The method can further comprise identifying the salient terms from a ranked set of candidate salient terms obtained from website name information of home pages. The method can further comprise identifying the salient terms from a ranked set of candidate salient terms obtained from a digital encyclopedia of user-editable data. The method can further comprise extracting collectively-derived salient terms from multiple other users and incorporating the collectively-derived salient terms in the generation of the document summaries of some or all returned search results.

Figure 6:
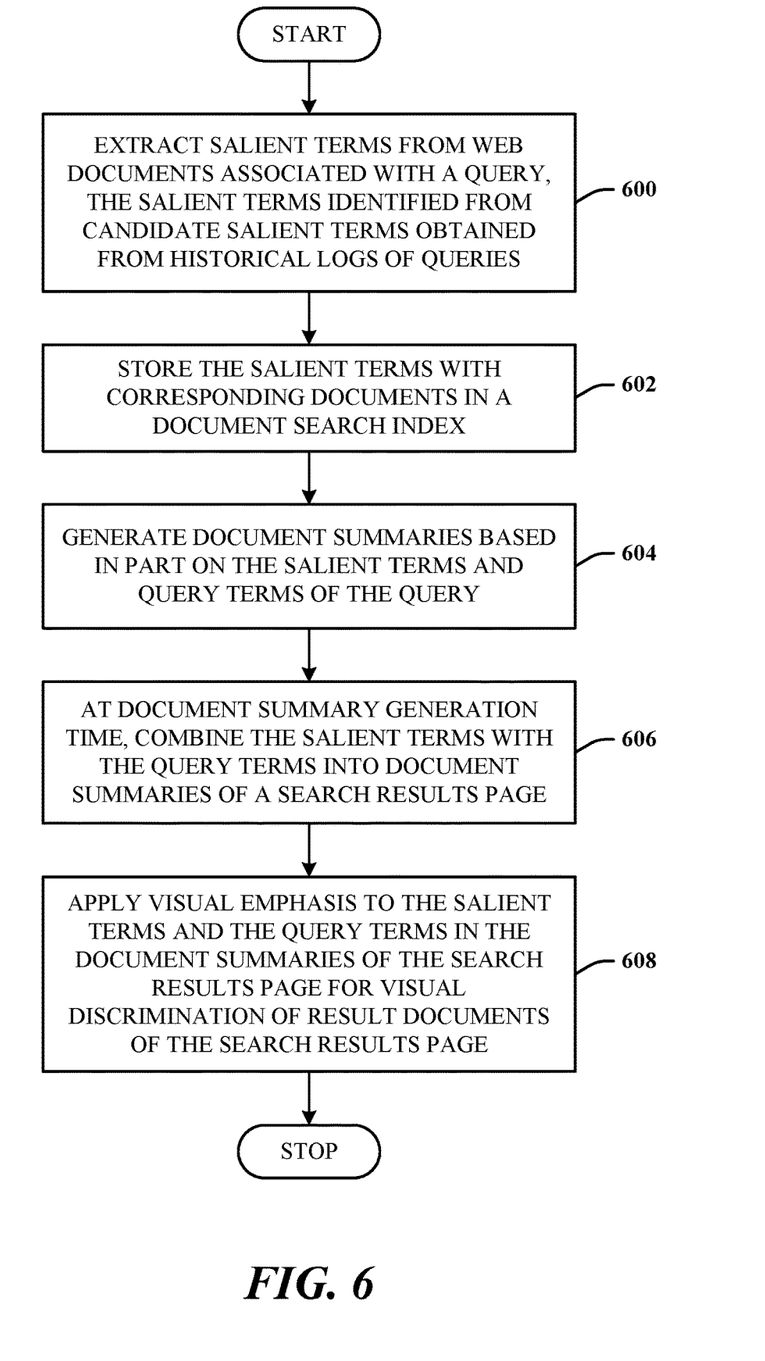
FIG. 6 illustrates an alternative method in accordance with the disclosed architecture.

FIG. 6 illustrates an alternative method in accordance with the disclosed architecture. At 600, salient terms are extracted from web documents associated with a query, the salient terms identified from candidate salient terms obtained from historical logs of queries. At 602, the salient terms are stored with corresponding documents in a document search index. At 604, document summaries are generated, in part, from the salient terms and the query terms of the query. At 606, at document summary generation time, the salient terms are combined with query terms in document summaries of a search results page. At 608, visual emphasis (e.g., bolding, highlighting, animation, etc.) is applied to the salient terms and the query terms in the document summaries of the search results page for visual discrimination of result documents of the search results page.

The method can further comprise assigning different weight values to the salient terms and the query terms based on corresponding sources of the result documents. The method can further comprise aggregating existing document metadata and extracting dominant terms from the aggregated document metadata.

The method can further comprise identifying the salient terms from a ranked set of the candidate salient terms obtained from factual answers to queries and from website name information of home pages. The method can further comprise identifying the salient terms from a ranked set of candidate salient terms obtained from a digital encyclopedia of user-editable data.

Figure 7:
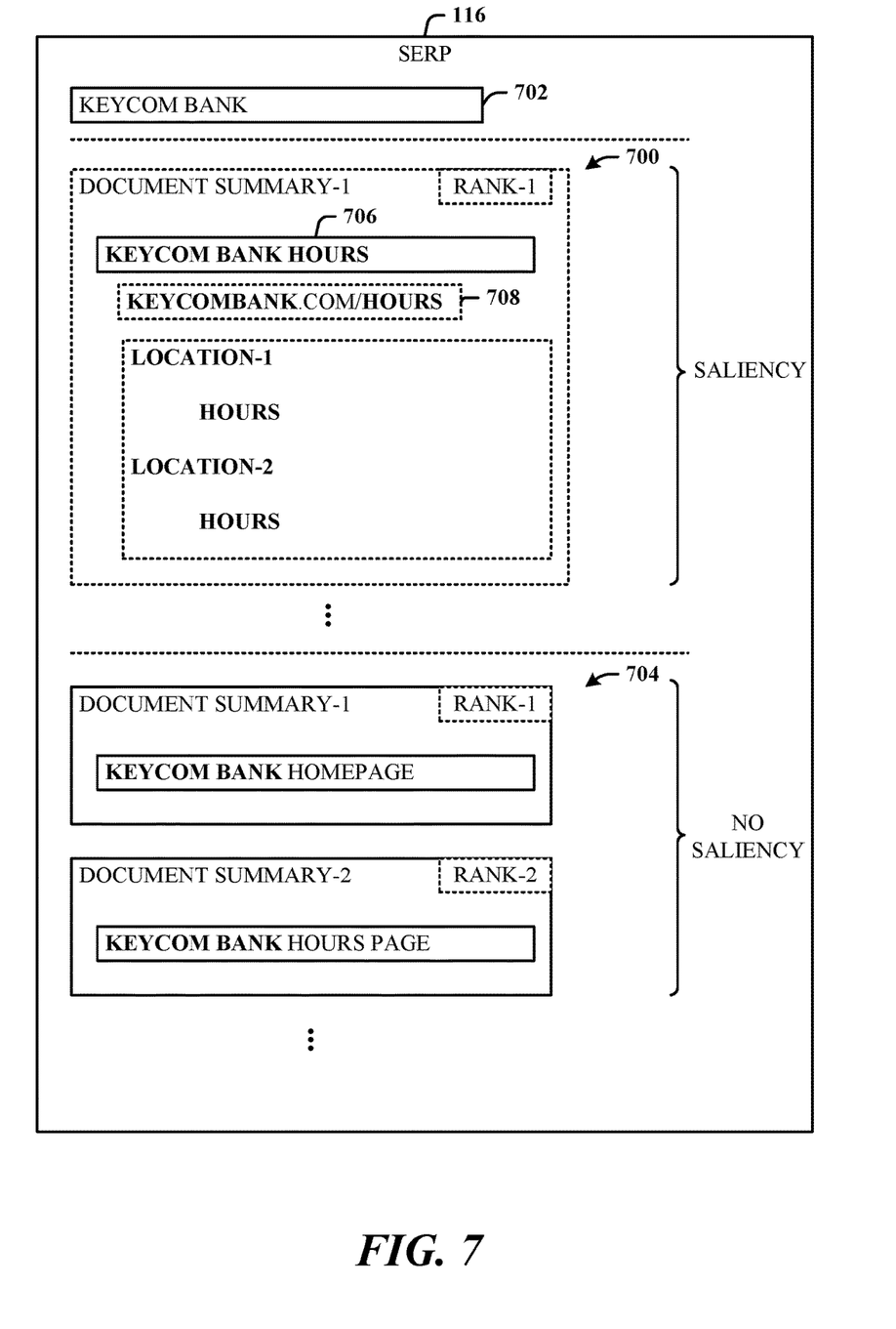
FIG. 7 illustrates an example document summary in the search engine results page that includes visually cued salient terms and query terms derived from a search query "keycom bank".

FIG. 7 illustrates an example document summary 700 in the search engine results page 116 that includes visually cued salient terms and query terms derived from the search query "keycom bank". For illustration and comparison purposes only, the SERP 116 shows a single query field 702 (commonly known and used for query entry and search purposes), and two instances of document summaries: the "saliency" document summary 700, and a set of "no saliency" summaries 704 (that represent traditional "no saliency" document summary formats).

However, it should be understood that when implementing the disclosed architecture, dominantly, the saliency document summaries are derived and presented in the SERP 116. However, since it may be conceivable that websites coming online are not sufficiently indexed, in which case, traditional "no saliency" document summaries may be generated and presented on the SERP 116 with the "saliency" document summaries.

For example, for the search terms "keycom bank", a document 706 having the name of KeyCom Bank Hours is retrieved, and further having a link 708 such as http://www.keycombank.com/hours/ can be returned as a result. The disclosed architecture extracts the term "hours" and location names (Location-1, Location-2) as salient terms, since these terms are the most discriminative (salient) terms for that page (result). Accordingly, the extraction component 102 operates to extract these salient terms from documents (e.g., using either supervised or unsupervised machine learning techniques), and uses at least the salient terms "hours", "Location-1", "Location-2" and the query terms "keycom" and "bank" to generate the document summary 700. Although not shown here, other content can be shown as well, such as maps for the listed locations.

The visual component 118 then operates to apply the visual emphasis (e.g., bolding) to the salient terms "hours", "Location-1", "Location-2", and query terms "keycom" and "bank" in the document summary 700 to assist the user in quickly focusing on the terms and determining if the document result is what the user wanted to see. Of course, in most cases, numerous other document summaries would be returned for presentation in the SERP 116. In contrast, the "no saliency" document summary 704 traditionally used in search engines merely bolds the query terms KeyCom and Bank—no saliency terms are presented.

Figure 8:
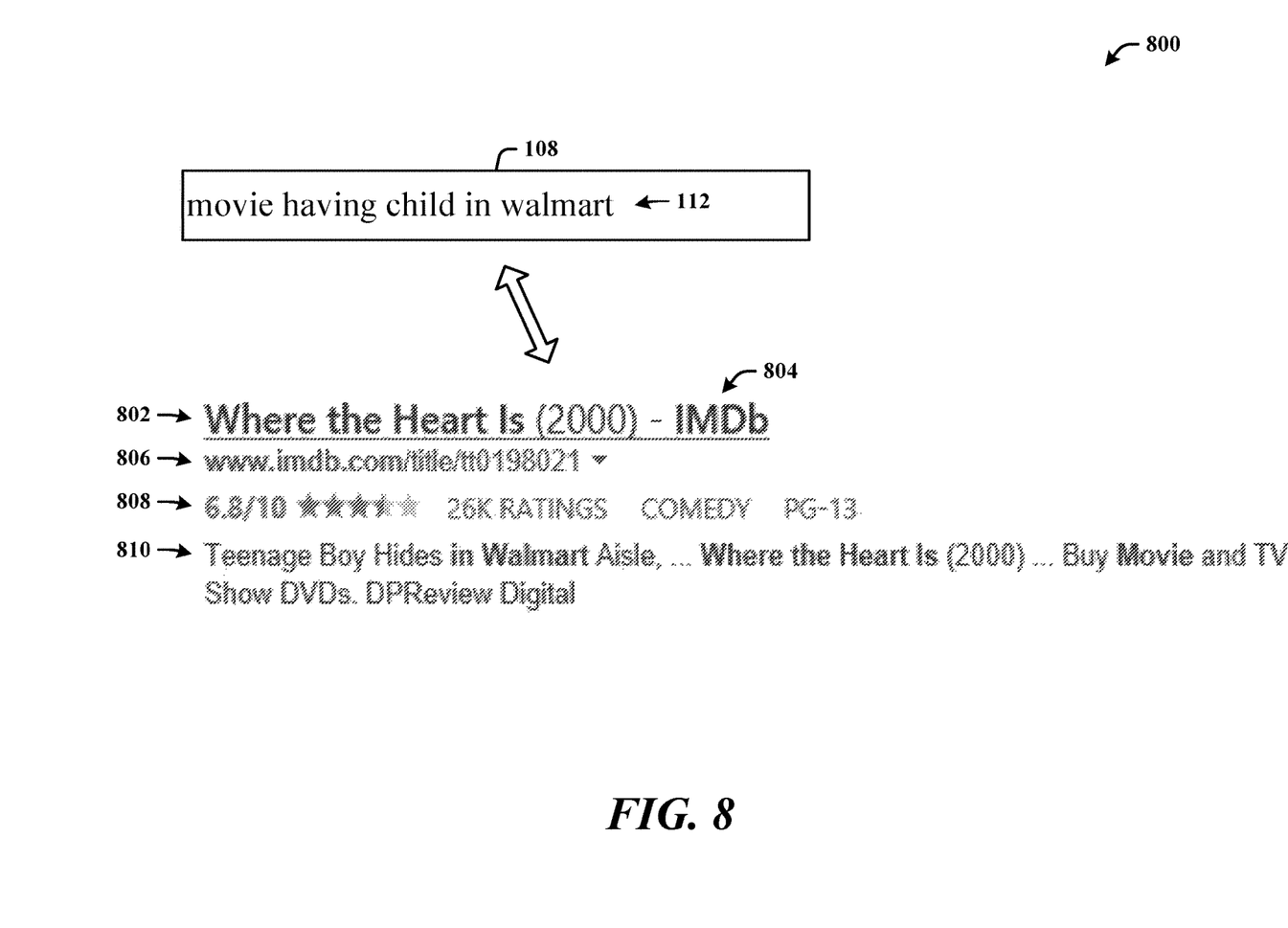
FIG. 8 illustrates an example document summary in the search engine results page that includes visually cued salient terms and query terms derived from the search query "movie having child in walmart".

FIG. 8 illustrates an example document summary 800 in the search engine results page 116 that includes visually cued salient terms and query terms 112 derived from the search query 108 "movie having child in walmart". The document summary 800 includes, in a field 802, the document title 804 "Where the Heart Is (2000)—IMDb", served as an active link for user navigation to the document. The summary 800 also includes a link field 806 in which an active link is provided to the document, stored at the website www.imdb.com.

The summary 800 can also include a field 808 that comprises ratings information (e.g., based on a ratio, the number of users who rated the movie) and movie genre information such as Comedy and PG-13 rating. The summary 800 can also comprise a brief description field 810 that includes salient terms and query terms. For example, the query 108 being "movie having child in walmart", the visual emphasis applied can be bolding to the salient terms of "Where the Heart Is" and "IMDb", and the query terms 112 of "Movie" and "Walmart". Thus, consistency in the visual cues is provided through bolding, to assist the user in quickly and effectively deciding if the summary 800 offer the information desired or at least warrants further scrutiny.

However, existing search engine implementations would likely extract the opening hours of the business, and alternatively, may extract the names of two locations (or more likely, decide that neither of the names is a dominant entity).

As used in this application, the term "component" is intended to refer to a computer-related entity, either hardware, a combination of software and tangible hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
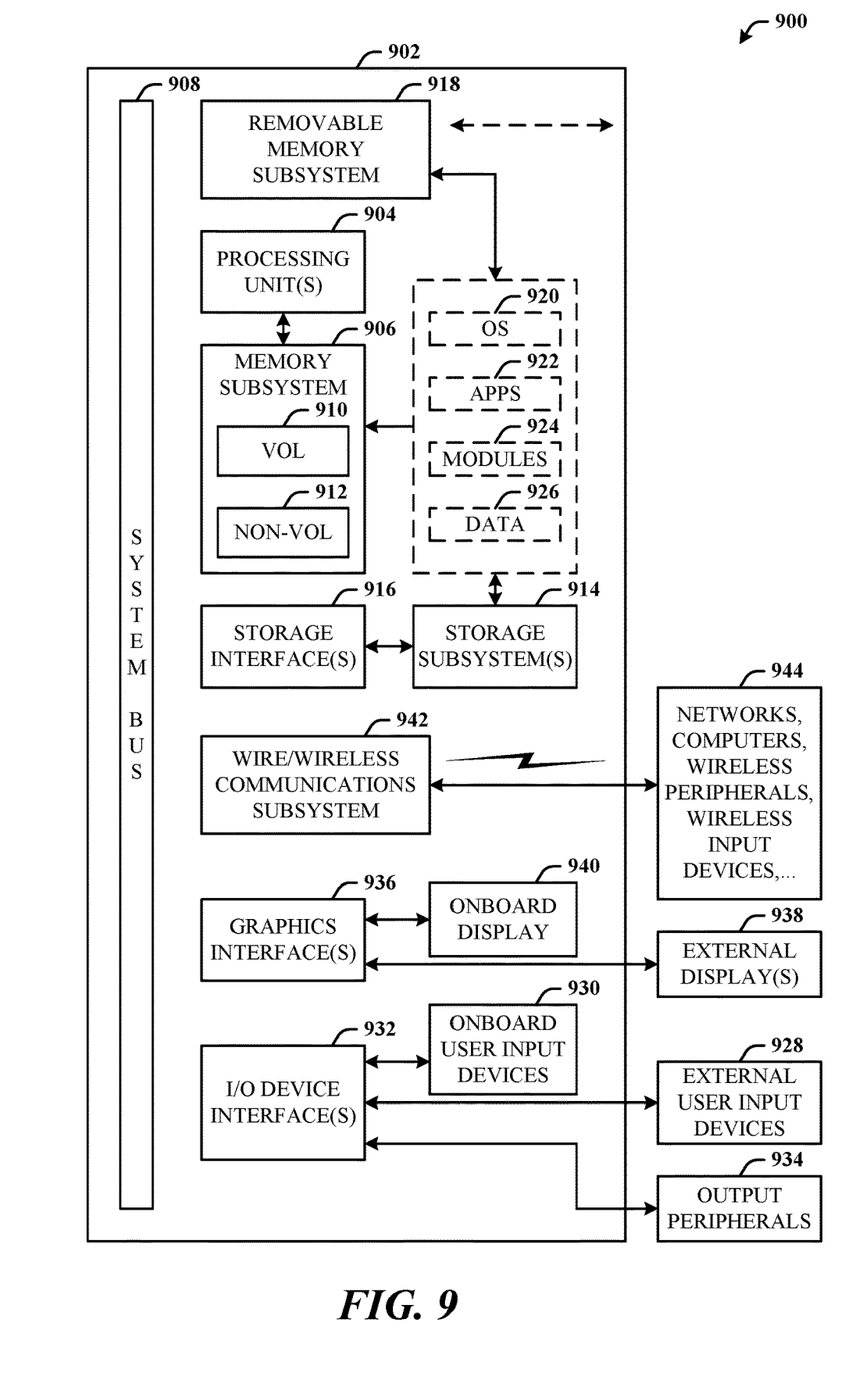
FIG. 9 illustrates a block diagram of a computing system that executes salient terms and entities for caption (summary) generation and visual cues in accordance with the disclosed architecture.

Referring now to FIG. 9, there is illustrated a block diagram of a computing system 900 that executes salient terms and entities for caption (summary) generation and visual cues in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), Systemon-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 900 for implementing various aspects includes the computer 902 having microprocessing unit(s) 904 (also referred to as microprocessor(s) and processor(s)), a computer-readable storage medium (where the medium is any physical device or material on which data can be electronically and/or optically stored and retrieved) such as a system memory 906 (computer readable storage medium/media also include magnetic disks, optical disks, solid state drives, external memory systems, and flash memory drives), and a system bus 908. The microprocessing unit(s) 904 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 902 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 906 can include computer-readable storage (physical storage) medium such as a volatile (VOL) memory 910 (e.g., random access memory (RAM)) and a non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the microprocessing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components and circuits. The storage subsystem(s) 914 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The operating system 920, one or more application programs 922, other program modules 924, and/or program data 926 can include items and components of the system 100 of FIG. 1, items, components, sources and algorithms of the extraction component 102 of FIG. 2, items and components of the alternative system 300 of FIG. 3, the SERP 116 and captions of FIG. 4, the example document summaries of FIGS. 7 and 8, and the methods represented by the flowcharts of FIGS. 5 and 6, for example.

Generally, programs include routines, methods, data structures, other software components, etc., that perform particular tasks, functions, or implement particular abstract data types. All or portions of the operating system 920, applications 922, modules 924, and/or data 926 can also be cached in memory such as the volatile memory 910 and/or non-volatile memory, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 902, and include volatile and non-volatile internal and/or external media that is removable and/or non-removable. For the computer 902, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 902, programs, and data using external user input devices 928 such as a keyboard and a mouse, as well as by voice commands facilitated by speech recognition. Other external user input devices 928 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 902, programs, and data using onboard user input devices 930 such a touchpad, microphone, keyboard, etc., where the computer 902 is a portable computer, for example.

These and other input devices are connected to the microprocessing unit(s) 904 through input/output (I/O) device interface(s) 932 via the system bus 908, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The disclosed architecture can be implemented as a system, comprising means for extracting salient terms from web documents associated with a query; means for generating document summaries based in part on the salient terms and query terms of the query; means for generating document summaries based on part on the salient terms; means for combining the salient terms with the query terms of the query in document summaries of a search results page; and, means for applying visual emphasis to the salient terms and the query terms in the document summaries of the search results page as visual cues.

The disclosed architecture can be implemented as an alternative system, comprising means for extracting salient terms from web documents associated with a query, the salient terms identified from candidate salient terms obtained from historical logs of queries; means for storing the salient terms with corresponding documents in a document search index; means for generating document summaries based on part on the salient terms; at document summary generation time, means for combining the salient terms with query terms of the query in document summaries of a search results page; and, means for applying visual emphasis to the salient terms and the query terms in the document summaries of the search results page for visual discrimination of result documents of the search results page.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one hardware processor and a memory, the at least one hardware processor configured to execute computer-executable instructions in the memory to enable one or more components, comprising:
     an extraction component configured to automatically extract document specific salient terms from web documents obtained for a query having query terms, the extraction component performing operations comprising:
       extracting candidate salient term information from a plurality of sources via operations comprising:
         mining historical logs and identifying queries that produced the web documents in a top threshold number of results; and aggregating document metadata;
selecting terms from one or both of the candidate salient term information as document specific salient terms without regard to the query terms;
storing the document-specific salient terms with corresponding documents in a document search index; and
assigning different weight values to the salient terms and the query terms based on corresponding sources of result documents;
a document summary component configured to generate document summaries of a search results page, the document summary component performing operations comprising incorporating the salient terms in the generation of the document summaries; and
a visual component configured to apply visual emphasis to the salient terms and the query terms of search results of the search results pages, the visual component performing operations comprising:
for some or all of the summaries in the search results pages:
combine the document-specific salient terms with the query terms of the query in document summaries of the search results page
identifying all words in the summary that correspond to a document-specific salient term or a query term; and
apply a visual emphasis to the identified words.

2. The system of claim 1, wherein the extraction component is configured to identify and extract the salient terms from feed documents of realtime feeds and enable caching of the salient terms from the feed documents.

3. The system of claim 1, wherein the document generation component is configured to use the query terms and the salient terms for the generation of the documents summaries.

4. The system of claim 1, wherein the extraction component is configured to identify and extract the salient terms from a ranked set of candidate salient terms obtained from aggregated document metadata or from factual answers to queries.

5. The system of claim 1, wherein the extraction component is configured to identify and extract collectively-derived salient terms related to identity of a source of the query, and incorporate the collectively-derived salient terms in the generation of the documents summaries, the visual component configured to apply the visual emphasis to the collectively-derived salient terms and the query terms in the document summaries of the search results.

6. The system of claim 1, wherein the extraction component is configured to identify and extract the salient terms from a ranked set of candidate salient terms obtained from website name information of home pages.

7. The system of claim 1, wherein the extraction component is configured to identify and extract the salient terms from a ranked set of candidate salient terms obtained from an online digital encyclopedia of user-editable data.

8. The system of claim 1, further comprising a weighting component configured to assign weighting values to the salient terms and query terms based on corresponding sources of the result documents.

9. A method, comprising acts of:
extracting a set of candidate salient terms from web documents associated with a query having query terms based on a set of sources associated with the web documents, each source having an associated method for extracting candidate salient terms, the set of candidate salient terms selected without regard to the query terms, the set of sources comprising:
historical logs showing prior queries that produced the web documents in a top threshold number of results; and
aggregated document metadata;
ranking the set of candidate salient terms;
selecting a threshold number of terms from the ranked set of candidate terms as document-specific salient terms associated with the web documents;
adding the document-specific salient terms to a document search index;
assigning different weight values to the document-specific salient terms and query terms based on corresponding sources of result documents;
generating document summaries based in part on the document-specific salient terms and the query terms of the query;
combining the document-specific salient terms with the query terms of the query in the document summaries of a search results page; and
applying visual emphasis to the document-specific salient terms and the query terms in the document summaries of the search results page as visual cues; and
displaying the document summaries as part of the search results page.

10. The method of claim 9, wherein the associated method comprises extracting salient terms from fresh documents, and caching the document-specific salient terms.

11. The method of claim 9, wherein the set of sources further comprises factual answers to queries or website name information of home pages.

12. The method of claim 9, wherein the associated method comprises extracting collectively-derived salient terms from multiple other users and incorporating the collectively-derived salient terms in the generation of the document summaries.

13. The method of claim 9, wherein the set of sources further comprises a digital encyclopedia of user-editable data.

14. The method of claim 9, further comprising extracting dominant terms from the aggregated document metadata.

* * * * *